UNITED STATES PATENT OFFICE.

PAUL EHRLICH AND ALFRED BERTHEIM, OF FRANKFORT-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

ARSENOARYLGLYCIN.

No. 888,321.   Specification of Letters Patent.   Patented May 19, 1908.

Application filed November 13, 1907. Serial No. 401,943. (Specimens.)

*To all whom it may concern:*

Be it known that we, PAUL EHRLICH, M.D., LL. D., Chicago, professor of medicine, and ALFRED BERTHEIM, Ph. D., both citizens of the Empire of Germany, and residing at Frankfort-on-the-Main, Germany, have invented certain new and useful Improvements in Arsenoarylglycins, of which the following is a specification.

We have found new compounds of which the constitution corresponds to the formula:

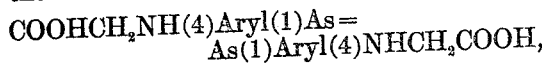

which may be obtained by reducing para-arylglycinarsenic acids. This reduction may, for example, be interpreted by the following equation:

These compounds are valuable as medicaments, being employed like atoxyl, which they surpass in their therapeutic action. They are red-brown powders insoluble in water, alcohol and ether, readily dissolved by dilute alkalies and alkali-carbonates. The alkali salts thus formed are of yellow coloration and from their solution the arsenoarylglycins are precipitated as yellow flakes on addition of dilute acids.

The new compounds may be obtained, for instance, as follows:

Example: A solution of 2 kilos of sodium hydrosulfite in 10 liters of water is added to 1 kilo of crystallized magnesium chlorid and 600 c.c. of caustic soda-lye of 10 times the strength of normal caustic soda-lye and the subsequently filtered solution is added to a hot solution of 200 grams of para-phenylglycinarsenic acid, which may be obtained by boiling para-aminophenylarsenic acid with chloro-acetic acid in aqueous solution, in 4 liters of water. The mixture is heated for about 1 hour to 50° C., whereupon yellow-brown flakes separate. They are filtered and washed with water. To remove slight impurities of the compound thus obtained, it may be dissolved in an excess of sodium carbonate to which is added in the heat lead acetate and after filtration the arsenophenylglycin may be precipitated with acetic acid. Washed and dried, the arsenophenylglycin represents a red-brown powder, insoluble in water, alcohol and ether. It is readily soluble in a solution of caustic soda and sodium carbonate with a yellow color and the sodium salt thus formed is precipitated by alcohol from the concentrated aqueous solution in form of a light yellow powder containing water of crystallization.

In an analgous manner the arsenotolyl- and arseno-xylylglycins, which are very similar to the arsenophenylglycin, may be manufactured from the homologous arylglycin para-arsenic acids. Those homologous acylglycin arsenic acids may be obtained in the same manner as phenylglycin arsenic acid, that is to say, by heating ortho- or meta-toluidin or para-xylidin with arsenic acid and then combining the thus obtained para-aminoarylarsenic acids with chloracetic acid.

Having now described our invention, what we claim is:

1. As products, the arsenoarylglycins of which the constitution corresponds to the formula:

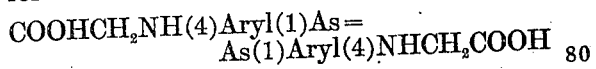

being red-brown powders, insoluble in water, alcohol and ether, soluble with formation of salts in caustic soda-lye and sodium carbonate with a yellow color, the isolated sodium salts being yellow powders, from the solution of which the arsenoarylglycins are precipitated as yellow-brown flakes by dilute acids, assuming, when filtered and dried, a darker tint.

2. As product, the arsenophenylglycin, corresponding to the formula:

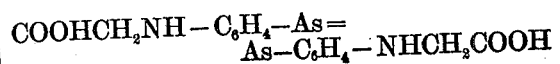

being a red-brown powder, insoluble in water, alcohol and ether, readily soluble in a sodium carbonate solution with a yellow color, from which solution it is precipitated by dilute acids as yellow flakes; the yellow sodium salt of the compound being difficultly soluble in alcohol.

In testimony, that we claim the foregoing as our invention, we have signed our names in presence of two subscribing witnesses.

PAUL EHRLICH.
ALFRED BERTHEIM.

Witnesses:
  JEAN GRUND,
  CARL GRUND.